United States Patent Office 3,509,236
Patented Apr. 28, 1970

3,509,236
MOLDING COMPOSITIONS COMPRISING VINYLIDENE CHLORIDE
Hubert Gross, Sieglar, Robert Büning, Oberlar, and Wolfgang Pungs, Troisdorf, Germany, assignors to Dynamit Nobel Aktiengesellschaft, Troisdorf, Bezirk Cologne, Germany, a corporation of Germany
No Drawing. Filed Feb. 16, 1967, Ser. No. 617,767
Claims priority, application Germany, Feb. 19, 1966, D 49,407
Int. Cl. C08f 29/14, 29/36, 37/18
U.S. Cl. 260—876     5 Claims

ABSTRACT OF THE DISCLOSURE

This specification discloses a plasticizer-free composition comprising about 50 to 95 weight percent of a first vinylidene chloride copolymer with at least one other ethylenically unsaturated monomer which is copolymerizable therewith; and about 5 to 50 weight percent of a graft second copolymer of vinylidene chloride and at least one other ethylenically unsaturated monomer which is graft copolymerizable therewith which graft copolymerization has taken place in the presence of a copolymer of ethylene and a vinyl ester. The first vinylidene chloride copolymer has a vinylidene chloride content of at least about 60 weight percent. A specific composition contains 70 weight percent of a first copolymer of 70 weight percent vinylidene chloride and 30 weight percent of vinyl chloride; and 30 weight percent of a graft copolymer prepared by polymerizing a mixture of 84.1 weight percent vinylidene chloride, 9.2 weight percent of ethyl acrylate and 6.7 weight percent of a previously formed ethylene-vinyl acetate copolymer containing 45 weight percent vinyl acetate. The product of this invention has flowing or moldability properties which are very similar to those of the first copolymer admixed with a plasticizer and substantially better physical properties than the said plasticized first copolymer.

---

This invention relates to compositions comprising vinylidene chloride which are suitable for use in producing shaped articles by compression, molding, extrusion, injection molding and other similar techniques. It more particularly refers to such vinylidene chloride containing compositions which are free of plasticizer.

Vinylidene chloride homo- and copolymers are quite well known. These materials have shown utility in the manufacture of filaments, sheets, tubes, films, extruded shapes and molded shapes. It is known that vinylidene chloride polymers are difficultly workable due to their brittleness, poor flowing qualities and susceptibility to thermal degradation during molding. It has therefore been common practice to incorporate plasticizer into such vinylidene chloride molding compositions in order to improve their workability. Thus, citric acid esters (see British Patent 739,411), sebacic acid esters (see U.S. Patent No. 2,604, 458) and/or phthalate esters (see British Patent No. 811,532) have been utilized in combination with vinylidene chloride polymer compositions.

It is known that these plasticized vinylidene chloride polymer compositions are less than wholly satisfactory for a number of reasons. In the first place, most of the known plasticizers which have been used have poor compatibility with polyvinylidene chloride compositions. Such compositions with plasticizer contents of as low as 10 weight percent have been known to sweat and to have a tendency to creep. Even more important, the utilization of plasticizers in combination with vinylidene chloride polymers significantly reduces the physical properties, particularly the tensile strength, of such polymers. Another disadvantage lies in the fact that these plasticizers are solvents for various foods and are absorbed thereby upon migration of the plasticizer to the surface of the vinylidene chloride polymer film or other food wrapper.

It has been attempted to remedy or at least minimize this latter disadvantage by utilizing high molecular weight plasticizers such as polysebacates. This technique has to some degree reduced the above recited disadvantages with respect to use of the compositions in combination with food.

Attempts have been made to incorporate various polymers into admixture with vinylidene chloride polymer compositions in order to further improve the usefulness of these compositions in the food packaging field. Such polymers include chlorinated olefin polymers, butadiene polymers and copolymers, ethylene-vinylacetate copolymers, and mixtures of various copolymers (see German Patent No. 1,201,545, French Patent No. 1,325,789, and British Patent 987,823). These combinations have resulted in compositions which are well suited to use with food at least with respect to the migration-absorption problems set forth above. Howeve, such compositions still do not possess the desired workability properties without the addition of plasticizers. It is therefore seen that little has been accomplished from proceeding in this direction. Further, an additional disadvantage has been introduced in that usually large proportions of admixture polymer must be utilized to be of use in the composition and this tends to increase the gas permeability of films produced therefrom, particularly permeability to water vapor and air.

It is therefore an object of this invention to provide a novel vinylidene chloride polymer composition.

It is another object of this invention to provide a novel molding material comprising vinylidene chloride polymer.

It is a further object of this invention to provide a plasticizer-free vinylidene chloride polymer molding composition having desirable workability characteristics and acceptable physical properties.

Other and additional objects of this invention will become apparent from a consideration of this entire specification including the claims appended hereto.

In accord with and fulfilling these objects, one aspect of this invention includes a composition comprising:

(1) About 50 to 95 weight percent of a copolymer of vinylidene chloride and at least one member selected from the groups consisting of vinylchloride vinyl esters, acrylontrile, acrylates, methacrylates, olefins, itaconates, maleates, fumarates and styrene containing at least about 60 weight percent vinylidene chloride; and (2) About 5 to 50 weight percent of a graft copolymer prepared by the graft copolymerization of vinylidene chloride and at least one other ethylenically unsaturated monomer copolymerizable with vinylidene chloride onto a vinyl ester-ethylene copolymer.

According to this invention, it is preferred to use as the copolymerizable comonomer in the graft copolymer at least one member selected from the group consisting of acrylates, methacrylate and acrylonitrile. This comonomer may be present in proportion of about 2 to 20 weight percent, preferably 2 to 12 weight percent. The vinyl ester may suitably be vinyl acetate or vinyl propionate, preferably vinyl acetate. The vinyl ester usually constitutes about 25 to 75 weight percent of the copolymer with ethylene making up the remainder. These copolymers generally have relative viscosities of about 1.5 to 5.0 measured as a solution in cyclohexane. The ethylene-vinyl ester copolymer is preferably used in proportion of about 0.5 to 20 weight percent of the graft copolymer.

Vinylidene chloride copolymers, such as are set forth in (1) above, are known materials. They are made by copolymerization at relatively high temperatures of about 60° C. or at relatively low temperatures of about −30 to 10° C. The low temperature produced products are generally preferred for use in this invention because they have greater thermal stability than the copolymers produced at higher temperatures.

The vinylidene chloride copolymers and the graft copolymers of this invention have unlimited compatability of proportion for each other. Therefore the flow characteristics, and thus the workability, of the compositions of this invention can be tailored as desired by varying the proportions of each. Variations in the proportions of the copolymer and the graft copolymer within the limits prescribed above do not give rise to significant changes in the physical properties of the resultant product such as with respect to tensile strength and chemical resistance.

The improvements in molding compositions which are achieved according to this invention can be determined by comparative measurement of the flowability, tensile strength, tearing strength, elongation and impact strength.

The compositions described herein are especially suitable for use in the manufacture of sheet materials for wrapping purposes. Such materials are outstanding not only in their heat-sealing qualities but also for their low permeability to water vapor and other gases. These flavor-sealing sheet materials can come into contact with foods containing fats and oils without producing any change in the taste or odor of such foods. Further, films and sheeting formed from the compositions of this invention do not exhibit blocking effects which are often characteristic of vinylidene chloride polymer films.

It is furthermore advantageous that the sheet materials formed from the composition of this invention are distinguished by good transparency and do not display the undesired cloudiness often observed in polymeric sheet materials. If, however, the sheets are manufactured from compositions containing an unmodified ethylene-vinyl ester copolymer as the additional component for admixture the vinylidene chloride copolymers instead of the graft copolymer described, cloudiness occurs in sheets containing more than 5 wt. percent of said ethylene copolymer. On the other hand, with additions of less than 5 wt. percent ethylene copolymer, no improvements are achieved in the mechanical and physical properties of the final composition. Heat and light stabilizers, antioxidants and other adjuvants such as lubricants, fillers and pigments which are conventionally used with vinylidene copolymers can be incorporated into the molding compositions manufactured according to the invention, in the customary quantities for the usual purposes. For example, epoxidized fatty esters can be added in amounts of 0.5 to 4 wt. percent as heat stabilizers. The molding compositions consisting of graft copolymer vinylidene chloride copolymer and working adjuvants can be worked by the customary methods using mixtures of extruding machines. These molding compositions can be made into pourable powders, agglomerates or granular products for easy transporation and further use.

Filaments, sheets, plates, extruded shapes, pipes, tubes and other products can be made from these molding compositions in extruding machines and injection molding machines. Shaping by calendering and pressing is also possible. These compositions can also be used for laminating purposes. In this manner, for example, polymers based on vinyl chloride, vinylidene chloride, styrene, olefins and the like, can be provided with tightly adherent, high impact-strength coatings made of the compositions described herein characterized by low permeability to water vapor and gases.

The following examples are illustrative of the practice and attributes of this invention without in any way being limiting thereon. Parts and percentages are by weight unless expressly stated to be to the contrary.

EXAMPLE 1

The thermoplastic workability of molding materials were tested by examining their flow characteristics in the plastic state. From the flowability determined at various temperatures it was possible to obtain technical manufacturing information, such as the general thermoplastic behavior of the molding compounds, the equivalence of various batches, the optimum working temperature, and certain rheological data. The flow characteristics of the molding materials were determined with a Göttfert-Wiedman type capillary viscosimeter by measuring the rate of extrusion at constant nozzle ratio (15:1), temperature (165° C.) and pressure (5) atmospheres excess pressure. Data is set forth for a particular molding material within the purview of this invention which has the following composition:

(a) 70 wt. percent of a copolymer made up of 70 wt. percent vinylidene chloride units (VDC) and 30 wt. percent vinyl chloride units (VC), and (b) 30 wt. percent of a graft copolymer made by polymerizing 84.1 wt. percent of vinylidene chloride and 9.2 wt. percent of ethyl acrylate in the presence of 6.7 wt. percent of ethylene-vinyl acetate copolymer containing 45 wt. percent of vinyl acetate units.

In addition to the flowability of this composition, that of the pure vinylidene chloride-vinyl chloride copolymer having the composition given under (a), with and without the addition of 5 wt. percent of plasticizer (acetyl tributyl citrate) is set forth for comparative purposes.

In order to show the improvements obtained by the invention, the flowability of mixtures of a vinylidene chloride-vinyl chloride copolymer of the composition given under (a) with 2 and 5 wt. percent of ethylene-vinyl acetate copolymer composed of 55 wt. percent of ethylene units and 45 wt. percent of vinyl acetate units, and with 30 wt. percent of a copolymer composed of 90 wt. percent vinylidene chloride units and 10 wt. percent acrylic acid ester units (AC) was additionally determined and is set forth below:

An additional 0.3 wt. percent of calcium stearate and 0.3 wt. percent of ethylene diamine distearate were added as working adjuvants, along with 3.0 wt. percent of epoxidized soybean oil as a heat stabilizer. The powdered mixtures were mixed and plasticized on a chromium-plated pair of rollers at 145° C. The flowabilities were then determined on the basis of the granulated product made from the sheet produced by the rolls.

TABLE 1

| Mixture composed of— | | Flowability (g./sec.) |
|---|---|---|
| 70 wt. percent copolymer (70% DVC—30% VC) | 30 wt. percent graft copolymer (composed as described under (b)). | 0.261 |
| 100 wt. percent copolymer (70% VDC—30% VC) | | 0.136 |
| 95 wt. percent copolymer (70% VDC—30% VC) | 5 wt. percent acetyltributylcitrate | 0.299 |
| 98 wt. percent copolymer (70% VDC—30% VC) | 2 wt. percent ethylene-vinyl acetate copolymer (55% Eth—45% VA) | 0.118 |
| 95 wt. percent copolymer (70% VDC—30% VC) | 5 wt. percent ethylene-vinyl acetate copolymer (55% Eth—45% VA). | 0.124 |
| 70 wt. percent copolymer (70% VDC—30% VC) | 30 wt. percent copolymer (90% VDC—10% AC). | 0.165 |

EXAMPLE 2

To determine the mechanical characteristics of compositions according to this invention, a copolymer composed of 70 wt. percent vinylidene chloride units and 30 wt. percent vinyl chloride units, with and without 5 wt. percent of acetyl tributyl citrate or with 3 wt. percent of a copolymer composed of 55 wt. percent ethylene units and 45 wt. percent vinyl acetate units, and with 30 wt. percent of a graft copolymer composed as stated under (b) in Example 1, with the incorporation of the working adjuvants named in Example 1, were mixed and plasticized on a chromium-plated pair of rollers at 145° C., and the specimens were then pressed at 135° C. and 150 atmospheres gauge pressure into plates 4 mm. thick. The following values were determined on these plates for the tensile strength, tear strength, elongation and impact strength.

TABLE 4

Tear strength:
    Longitudinal _____ kg./cm.$^2$__ 580
    Transverse _____ kg./cm.$^2$__ 560
Elongation at break:
    Longitudinal _____ percent__ 50
    Transverse _____ do____ 60
Shrinkage at 100° C.:
    Longitudinal _____ do____ 19
    Transverse _____ do____ 21

EXAMPLE 5

Using a graft copolymer different from the one in Example 4 and having a higher content of ethylene-vinyl acetate copolymer but a smaller percentage of ethyl acrylate and methyl methacrylate comonomer units, a film was

TABLE 2

| Mixture composed of— | Tensile strength, kg./cm.$^2$ | Tear strength, kg./cm.$^2$ | Elongation at break, percent | Impact strength in cm. kg./cm.$^2$ | | | |
|---|---|---|---|---|---|---|---|
| | | | | 20° C. | 0° C. | −20° C. | −40° C. |
| 100 wt. percent copolymer (70% VDC—30% VC) | 260 | 185 | 190 Unbroken____ | 19 | 13 | 11 | |
| 95 wt. percent copolymer (70% VDC—30% VC) <br> 5 wt. percent acetyl tributyl citrate | 160 | 135 | 325 ____do_____ | 23 | 9 | 7 | |
| 97 wt. percent copolymer (70% VDC—30% VC) <br> 3 wt. percent copllymer (55% Eth—45% VA) | 235 | 175 | 160 ____do_____ | 16 | 6 | 5 | |
| 70 wt. percent copolymer (70% VDC—30% VC) <br> 30 wt. percent graft copolymer (composed as stated under (b) in Ex. 1) | 290 | 220 | 480 ____do_____ | 54 | 22 | 18 | |

EXAMPLE 3

For further study of the working characteristics of the compositions of this invention, a film was prepared in a conventional manner by means of tubular extrusion and biaxial orientation.

The mixture used was composed of:

(a) 70 wt. percent vinylidene chloride-vinyl chloride copolymer composed of vinylidene chloride units and vinyl chloride units in a weight ratio of 70:30, and (b) 30 wt. percent of a graft copolymer composed as described under (b) in Example 1.

Also, the working adjuvants described in Example 1 were added in the same quantities. At a maximum extrusion temperature of 165° C., a transparent, shrinkable sheet 9.017 mm. thick was obtained, having the following physical characteristics:

TABLE 3

| | Longitudinal | Transverse |
|---|---|---|
| Tearing strength in kg./cm.$^2$ | 585 | 610 |
| Elongation at break, percent | 60 | 85 |
| Folding cycles | >50,000 | >50,000 |
| Shrinkage, percent: | | |
|   At 100° | 20 | 23 |
|   At 120° | 36 | 40 |
| Diffusion constant for water vapor in g./cm./h./Torr | 0.4·10$^{-9}$ | |
| Cold bending-impact value | Good | −40° C. |

EXAMPLE 4

Under the working conditions described in Example 3, a transparent, shrinkable blow sheet was prepared from a mixture of 70 wt. percent of the vinylidene chloride-vinyl chloride copolymer described in Example 1 and 30 wt. percent of a graft copolymer. The graft copolymer used was obtained by the polymerization of 84.1 wt. percent vinylidene chloride, 4.6 wt. percent ethyl acrylate and 4.6 wt. percent methyl methacrylate in the presence of 6.7 wt. percent ethylene-vinyl acetate copolymer composed of ethylene units and vinyl acetate units in a weight of 55:45.

The following characteristics were determined in the sheet which was 0.020 mm. thick:

prepared under the conditions described in Example 3, using the same working adjuvants.

The mixture that was worked consisted of:

(a) 70 wt. percent of a vinylidene chloride-vinyl chloride copolymer composed of vinylidene chloride and vinyl chloride units in a weight ratio of 70:30.

(b) 30 wt. percent of a graft copolymer that had been manufactured by the polymerization of 84.3 wt. percent vinylidene chloride, 3.1 wt. percent ethyl acrylate and 3.1 wt. percent methyl methacrylate in the presence of 9.5 wt. percent of ethylene-vinyl acetate copolymer containing ethylene units and vinyl acetate units in the weight ratio of 55:45.

The testing of the transparent, shrinkable film, which had a thickness of 0.040 mm., produced the following values:

TABLE 5

Tear strength:
    Longitudinal _____ kg./cm.$^2$__ 480
    Transverse _____ kg./cm.$^2$__ 520
Elongation at break:
    Longitudinal _____ percent__ 115
    Transverse _____ do____ 60
Shrinkage at 100° C.:
    Longitudinal _____ do____ 14
    Transverse _____ do____ 16

EXAMPLE 6

By the presence of chain transferring agents, such as trichlorethylene, in the manufacture of the graft copolymer it is possible to achieve an additional modification of the graft copolymer, which has an effect on the characteristics of the composition of this invention.

30 wt. percent of a graft copolymer that had been made as in Example 5 except that the polymerization was additionally performed in the presence of 2.5 wt. percent of trichlorethylene, was mixed with 70 wt. percent of a vinylidene chloride-vinyl chloride copolymer composed like the one used in Example 5, and extruded together with the adjuvants and under the conditions described in Example 3, to form a blow film. The testing of the transparent, shrinkable sheet, which was 0.015 mm. thick, gave the following results:

TABLE 6

Tear strength:
  Longitudinal _____ kg./cm.² __ 590
  Transverse _____ kg./cm.² __ 620
Elongation at break:
  Longitudinal _____ percent __ 75
  Transverse _____ do ____ 80
Shrinkage at 100° C.:
  Longitudinal _____ do ____ 20
  Transverse _____ do ____ 20

EXAMPLE 7

A mixture of 70 wt. percent of the vinylidene chloride-vinyl chloride copolymer that is composed like the one used in Example 1, and 30 wt. percent of a graft copolymer made by the polymerization of 88.4 wt. percent vinylidene chloride, 3.3 wt. percent acrylonitrile and 3.3 wt. percent methyl methacrylate in the presence of 5 wt. percent of an ethylene-vinyl acetate copolymer composed of 55 wt. percent ethylene units and 45 wt. percent vinyl acetate units, was made into a transparent, shrinkable film under the working conditions and with the adjuvants of Example 3.

The following characteristics were measured on the 0.030 mm. thick film:

TABLE 7

Tear Strength:
  Longitudinal _____ kg./cm.² __ 610
  Transverse _____ do ____ 665
Elongation at break:
  Longitudinal _____ percent __ 25
  Transverse _____ do ____ 32
Shrinkage at 100° C.:
  Longitudinal _____ do ____ 14
  Transverse _____ do ____ 10

The vinylidene chloride-vinyl chloride copolymer mentioned in the examples was manufactured in the following manner:

200 ml. of methanol, 220 ml. desalted water, 1.5 g. K–30 emulsifier (commercial product of Badische Anilin- und Soda-Fabrik, Ludwigshafen), 150 cm.³ vinylidene chloride, 50 cm.³ vinyl chloride, 0.33 g. ascorbic acid and 0.67 ml. $H_2O_2$ (in a 30% solution) were mixed in an autoclave under nitrogen. The mixture was stirred with a paddle stirrer (250 r.p.m.) and cooled at −15° C. Then 0.67 ml. of a 10% iron sulfate solution in 40 ml. of water. Upon the addition of the iron sulfate solution, the polymerization commenced and terminated after 23 hours. The emulsion was transferred to a rotary evaporator, freed "in vacuo" of unreacted monomer, and precipitated with 10% sodium chloride solution. The polymer was suction filtered, washed with water and methanol and dried at 50° C.

The graft copolymers mentioned in the examples were manufactured by the following procedure:

133 g. of vinylidene chloride, 10 g. of acrylic acid methyl ester and 23.2 g. of a copolymer composed of ethylene and vinyl acetate units in a weight ratio of 55:45 were dissolved under nitrogen at 20° C. The solution was added to a solution of 0.4 g. of methyl cellulose in 307 ml. of water, suspended with a propeller stirrer at 450 r.p.m. and 1 g. of cyclohexanesulfonylacetyl peroxide was added. At a polymerization temperature of 20° C., a transformation of 95% is obtained after 18 hours.

As recited, the first copolymer comprises vinylidene chloride and at least one of the member of the group consisting of vinylchloride, vinyl esters, acrylonitrile, acrylates, methacrylates, olefins, itaconates, maleates, fumarates and styrene. Exemplary of the comonomers referred to are vinyl acetate; vinyl propionate; methyl; ethyl; propyl, and butyl, acrylates, methacrylates, itaconates, maleates and fumarates; ethylene; propolene; and butene-1.

What is claimed is:
1. A plasticizer-free vinylidene chloride composition having a polymer content consisting essentially of:
    (a) about 50 to 95 weight percent of a copolymer of at least about 60 weight percent vinylidene chloride and at least one member selected from the group consisting of vinyl chloride, vinyl alkanoates, acrylonitrile, lower alkyl acrylates, and lower alkyl methacrylates; and
    (b) about 5 to 50 weight percent of a graft copolymer prepared by grafting a mixture of at least one ethylenically unsaturated monomer, and vinylidene chloride onto a vinyl ester-ethylene copolymer; wherein said vinyl ester is selected from the group consisting of vinyl acetate, vinyl propionate, and mixtures thereof and is present in said vinyl ester-ethylene copolymer in a proportion of about 25 to 75 weight percent; wherein said ethylenically unsaturated monomer is selected from the group consisting of acrylates, methacrylates, acrylonitrile and mixtures thereof; and wherein said ethylene-vinyl copolymer constitutes about 0.5 to 20 weight percent of the graft copolymer, said ethylenically unsaturated monomer constitutes about 2 to 20 weight percent of said graft copolymer, and said vinylidene chloride is the remainder.
2. A composition as claimed in claim 1, comprising:
    (a) about 70 weight percent of a copolymer of about 70 weight percent vinylidene chloride and about 30 weight percent vinyl chloride; and
    (b) about 30 weight percent of a graft copolymer of about 88.4 weight percent vinylidene chloride, about 3.3 weight percent acrylonitrile, about 3.3 weight percent methyl methacrylate and about 5 weight percent of an ethylene-vinyl acetate copolymer containing about 45 weight percent vinyl acetate.
3. A composition as claimed in claim 1, comprising:
    (a) about 70 weight percent of a copolymer of about 70 weight percent vinylidene chloride and about 30 weight percent vinyl chloride; and
    (b) about 30 weight percent of a graft copolymer of about 84.1 weight percent vinylidene chloride, about 4.6 weight percent ethyl acrylate, about 4.6 weight percent methyl methacrylate and about 6.7 weight percent of an ethylene-vinyl acetate copolymer containing about 45 weight percent vinyl acetate.
4. A composition as claimed in claim 1, comprising:
    (a) about 70 weight percent of a copolymer of about 70 weight percent vinylidene chloride and about 30 weight percent vinyl chloride; and
    (b) about 30 weight percent of a graft copolymer of about 84.1 weight percent vinylidene chloride, about 9.2 weight percent ethyl acrylate and about 6.7 weight percent ethylene-vinyl acetate copolymer containing about 45 weight percent vinyl acetate.
5. A composition as claimed in claim 1, wherein said ethylenically unsaturated monomer comprises about 2 to 12 weight percent of said graft copolymer.

References Cited

UNITED STATES PATENTS 3,322,862   5/1967   Havens et al.
3,358,054   12/1967  Hardt et al. ____ 260—876 XR
3,400,173   9/1968   Reischl et al. ____ 260—878 XR

FOREIGN PATENTS 783,790   10/1957   Great Britain.
814,393   6/1959    Great Britain.

SAMUEL H. BLECH, Primary Examiner

C. J. SECCURO, Assistant Examiner

U.S. Cl. X.R.

260—897, 878